United States Patent [19]

Bruce

[11] Patent Number: 5,683,835
[45] Date of Patent: Nov. 4, 1997

[54] LITHIATED MANGANESE OXIDE

[75] Inventor: Peter George Bruce, St. Andrews, United Kingdom

[73] Assignee: Ultralife Batteries (UK) Limited, United Kingdom

[21] Appl. No.: 525,669
[22] PCT Filed: Mar. 17, 1994
[86] PCT No.: PCT/GB94/00545
§ 371 Date: Sep. 15, 1995
§ 102(e) Date: Sep. 15, 1995
[87] PCT Pub. No.: WO94/21560
PCT Pub. Date: Sep. 29, 1994
(Under 37 CFR 1.47)

[30] Foreign Application Priority Data

Mar. 17, 1993 [GB] United Kingdom ............ 9305440
Mar. 17, 1993 [GB] United Kingdom ............ 9305457

[51] Int. Cl.$^6$ ............................. C01G 45/12; H01M 4/50
[52] U.S. Cl. ............................................ 429/224; 423/599
[58] Field of Search .............................. 423/599; 429/224

[56] References Cited

U.S. PATENT DOCUMENTS

| 4,828,834 | 5/1989 | Nagaura et al. | 429/224 |
| 5,135,732 | 8/1992 | Barboux et al. | 423/599 |

FOREIGN PATENT DOCUMENTS

| 173574 | 7/1989 | Japan. | |
| 9722 | 1/1990 | Japan. | |
| 198028 | 7/1992 | Japan | 423/599 |
| 2221213 | 1/1990 | United Kingdom | 423/599 |

Primary Examiner—Wayne Langel
Attorney, Agent, or Firm—Nixon & Vanderhye P.C.

[57] ABSTRACT

Lithium manganese ternary oxide $Li\,Mn_2\,O_{4+x}$ is produced, where $0 \leq x \leq 0.2$, by adding carbon to a manganese-containing solution such as manganese acetate and reacting the solution in an inert atmosphere with a lithium-containing compound such as lithium hydroxide and ammonia. Carbon is added in a proportion up to 8 percent of the weight of the $Li\,Mn_2\,O_{4+x}$ produced, and preferably the proportion of carbon added is in the range 2 to 6 percent by weight of $Li\,Mn_2\,O_{4+x}$. The carbon is preferably carbon powder such as carbon black. Preferably, the $Li\,Mn_2\,O_{4+x}$ produced as a gelatinous precipitate is dried and heat treated. Alternatively, lithium manganese ternary oxide $Li\,Mn_2\,O_{4+x}$ is produced by reacting a manganese-containing compound with lithium carbonate. The reaction takes place in water and a precipitate is formed which is dried. The dried precipitate may be heat treated. The manganese-containing compound comprises manganese acetate. Carbon such as carbon powder may be added to the mixture before the reaction occurs.

26 Claims, 4 Drawing Sheets

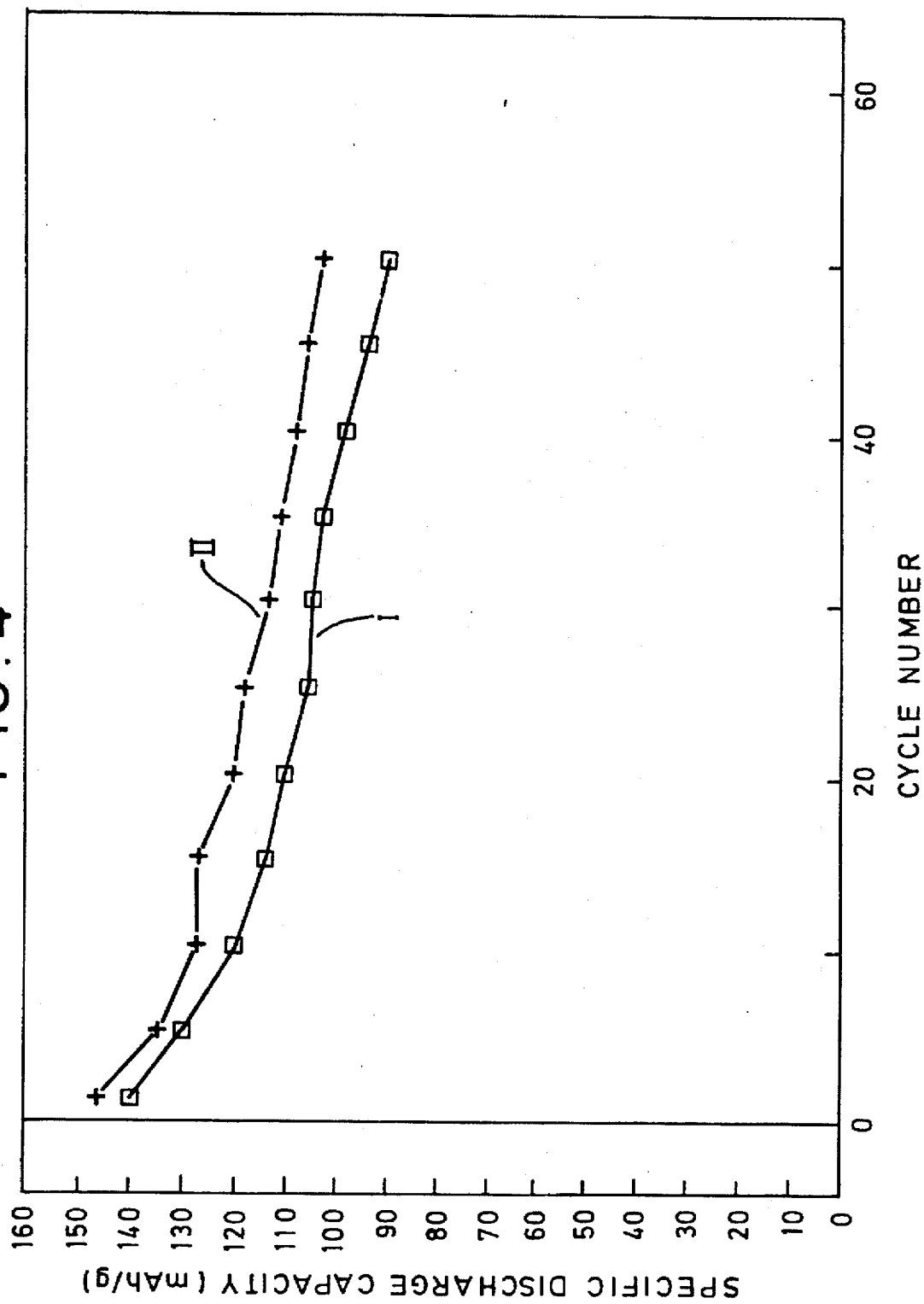

LITHIATED MANGANESE OXIDE

This invention relates to a method for the preparation of lithium manganese oxide which is used as an intercalation compound in secondary batteries.

A low temperature method for the preparation of lithiated manganese oxide $LiMn_2O_4$ is described in U.S. Pat. No. 5,135,732 in which solutions of manganese acetate and hydroxides of lithium and ammonium are reacted in amounts sufficient to yield the stoichiometric phase of $LiMn_2O_4$. The reaction is conducted in an inert atmosphere and results in a gelatinous precipitate which is dried to produce a pure $LiMn_2O_4$ phase with a small grain size.

An object of the present invention is to provide an improved method for the preparation of lithium manganese oxide, and a method of producing lithium manganese oxide which gives improved performance in secondary batteries.

According to one aspect, the invention consists of adding carbon to a manganese-containing solution prior to reacting said solution with a lithium-containing compound in an inert atmosphere to produce $LiMn_2O_{4+x}$, where $0 \leq x \leq 0.2$.

Preferably, the carbon takes the form of powder, such as carbon black, and is present in a proportion up to 8 percent by weight of the $LiMn_2O_{4+x}$ produced; preferably, in the range 2 to 6 per cent by weight, with an optimum level of substantially 4 per cent by weight.

A lithium manganese oxide prepared by this method gives improved performance when used in the cathode of a secondary battery, especially in regard to the rate of decline of battery capacity with repeated charge/discharge cycling.

According to a second aspect, the invention consists in reacting a manganese-containing compound with a lithium carbonate to produce $LiMn_2O_{4+x}$, where $0 \leq x \leq 0.2$.

Preferably, lithium carbonate $Li_2CO_3$ is reacted with manganese acetate $(CH_3CO_2)_2 \cdot Mn \cdot 4H_2O$ to produce the $LiMn_2O_{4+x}$ as a precipitate, which is then dried.

Carbon may be added to the solution to improve the performance of the $LiMn_2O_{4+x}$ when used in batteries.

This method of preparation does not involve the need for an inert atmosphere, and thus it is easier to implement than the prior art method of U.S. Pat. No. 5,135,732.

BRIEF DESCRIPTION OF THE DRAWINGS

The invention will now be described by way of example with reference to the accompanying drawings in which:

FIG. 4 is a graph showing the variation of the specific discharge capacity of a secondary battery with repeated charge/discharge cycling, the cathode of the battery incorporating $LiMn_2O_{4+x}$ which in curve I, is prepared according to the second method of the invention but without carbon, and in curve II is prepared according to the second method of the invention but with carbon.

Figure 1:
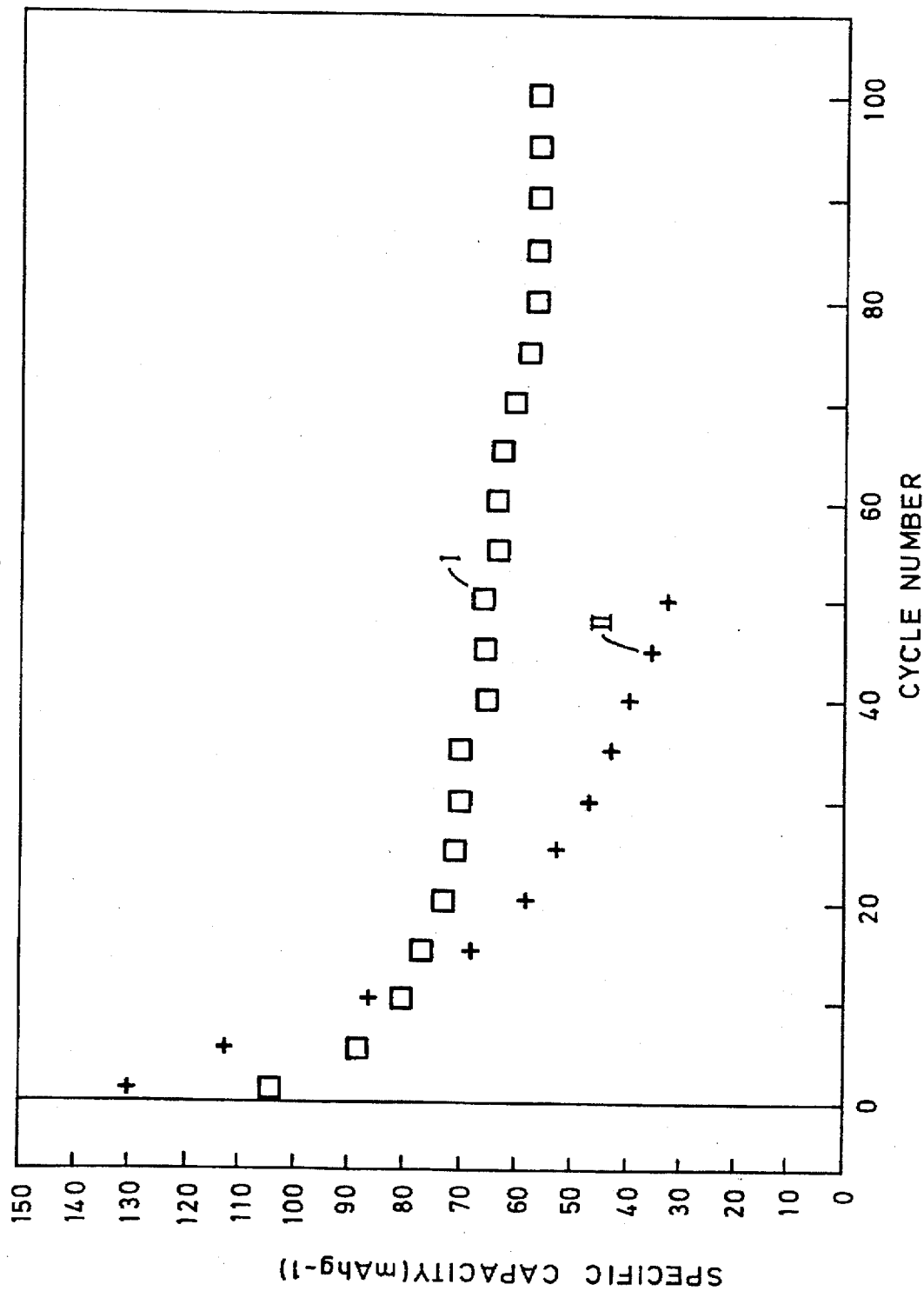
FIG. 1 is a graph showing the variation of the specific discharge capacity of a battery with repeated charge/discharge cycling, the cathode of the battery incorporating $LiMn_2O_{4+x}$ which in curve I, is prepared according to a first method of the invention, and in curve II is prepared according to the prior art method of U.S. Pat. No. 5,135,732.

In the first method of the invention, 0.3 grams of carbon black was added to 100 milliliters of manganese acetate solution $(CH_3CO_2)_2Mn \cdot 4H_2O$ and stirred by bubbling argon through it. A measure of 40 milliliters of a solution of lithium hydroxide $LiOH \cdot H_2O$ and ammonia $NH_4OH$ was added to the manganese acetate solution and stirred vigorously by bubbling argon through it for half an hour, thereby producing a gelatinous precipitate. The manganese acetate solution was a 0.8 Mol solution (Aldrich 99+%), and the lithium hydroxide and ammonia solution comprised 1 Mol LiOH (Aldrich 99.9%) and 3 Mol $NH_4OH$ (33% solution). Water was removed from the gelatinous precipitate using a rotary evaporator operating at 85° C. so as to produce a xerogel. The xerogel was then further dried at 60°–80° C. under a dynamic vacuum for 2 hours in order to ease removal of the xerogel from the vessel in which it was prepared. Finally, 2 grams of the xerogel were packed in a 25 milliliter alumina crucible and heated in air at 300° C. for 48 hours. Following this heat treatment the xerogel takes the form of lithium manganese oxide spinel $LiMn_2O_{4+x}$, where $0 \leq x \leq 0.2$. The heat treatment can be effected in the temperature range 200° C. to 700° C.

The performance of the $LiMn_2O_{4+x}$ was tested by incorporation in the cathode of a battery. A dry mixture of $LiMnO_2O_{4+x}$ (80% by weight), carbon (13.3% by weight) and polytetrafluoroethylene (6.7% by weight) was compressed on a nickel mesh grid to produce a cathode with an area of 0.9 cm$^2$ containing 12 milligrams of the mixture. This cathode was incorporated into a battery with a lithium anode and electrolyte of lithium hexafluoroarsenate and propylene carbonate $LiAsF_6$/PC.

This battery was subject to a charging/discharging cycling test and its specific discharge capacity measured for various cycles during the test. The test employed cut-off potentials of 3.7 volts and 2 volts and a discharge current of 440 microamps. The test results are shown in FIG. 1 as curve I, and are compared with the test results (curve II) for a similar battery incorporating $LiMn_2O_{4+x}$ prepared by a similar process to that described above, but without the carbon black, i.e. $LiMn_2O_{4+x}$ prepared according to the prior art method of U.S. Pat. No. 5,135,732. Curve 1 in FIG. 1 shows that the battery with the cathode formed from $LiMn_2O_{4+x}$ prepared using carbon, has a lower rate of decline of specific discharge capacity, than that of the battery with a cathode incorporating $LiMn_2O_{4+x}$ prepared without using carbon (curve II).

Figure 2:
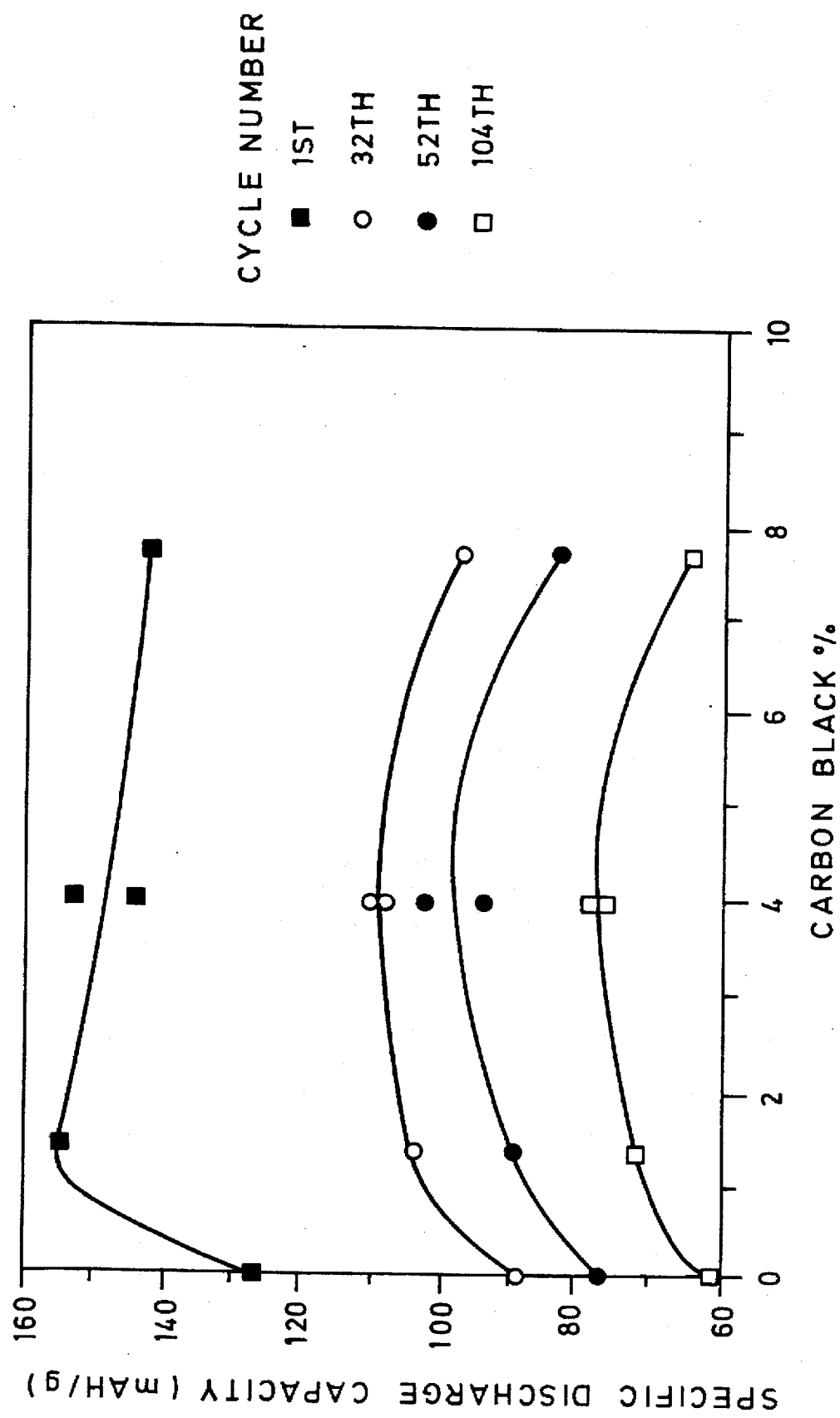
FIG. 2 is a graph showing the variation of the specific discharge capacity of a battery with repeated charge/discharge cycling, the cathode of the battery incorporating $LiMn_2O_{4+x}$ prepared according to the first method of the invention but with different proportions by weight of carbon in different samples.

In order to investigate the effect of using different amounts of carbon in preparing the $LiMn_2O_{4+x}$, the same preparation method described above was used with different amounts of carbon black, and these samples were all tested in the manner described above by measuring the specific discharge capacity of a battery having a cathode made from the sample. The samples contained 0%, 1.3%, 4% and 7.5% by weight of carbon black, and the specific discharge capacity was measured on the 1st, 32nd, 52nd and 104th cycle of the test. The results are shown in FIG. 2, which indicates an optimum level of carbon black at about 4% by weight of the $LiMn_2O_{4+x}$ sample.

It will be appreciated that in alternative embodiments of the invention, other forms of carbon may be used instead of carbon black, for example, graphite and pitch coke.

In a second method of the invention, 0.5 grams of lithium carbonate $Li_2CO_3$ (BDH AnalaR, 99.5%) was added to 20–30 milliliters of distilled water and stirred for half an hour. Manganese acetate $(CH_3CO_2)_2$ $Mn.4H_2O$ (Aldrich 99+%) was added to the lithium carbonate solution and stirred for one hour. The amount of manganese acetate added was 6.6339 grams so that the ratio of manganese to lithium is 2:1. A precipitate was formed from the solution. Water was removed from the precipitate using a rotary evaporator operating at 85° C. The precipitate may then be pre-dried at 60°–80° C. under vacuum conditions for 2 hours. Finally, 1–2 grams of the precipitate was packed in a 25 milliliter alumina crucible and heated in air at a temperature that was increased at a rate of 4° C. per minute from room temperature to 300° C. and held at 300° C. for a period of 48 hours. Following the heat treatment, the precipitate takes the form of lithium manganese oxide spinel $LiMn_2O_{4+x}$, where $0 \leq x \leq 0.2$. The heat treatment can be effected within the temperature range 200° C. to 700° C.

The performance of the $LiMn_2O_{4+x}$ was tested by incorporation in the cathode of a battery. A dry mixture of $LiMnO_2O_4$ (80% by weight), carbon (13.3% by weight) and polytetrafluoroethylene (6.7% by weight) was compressed on a nickel mesh grid to produce a cathode with an area of 0.9 cm$^2$ containing 12 milligrams of the mixture. This cathode was incorporated into a battery with a lithium anode and electrolyte of lithium hexafluoroarsenate and propylene carbonate $LiAsF_6/PC$.

Figure 3:
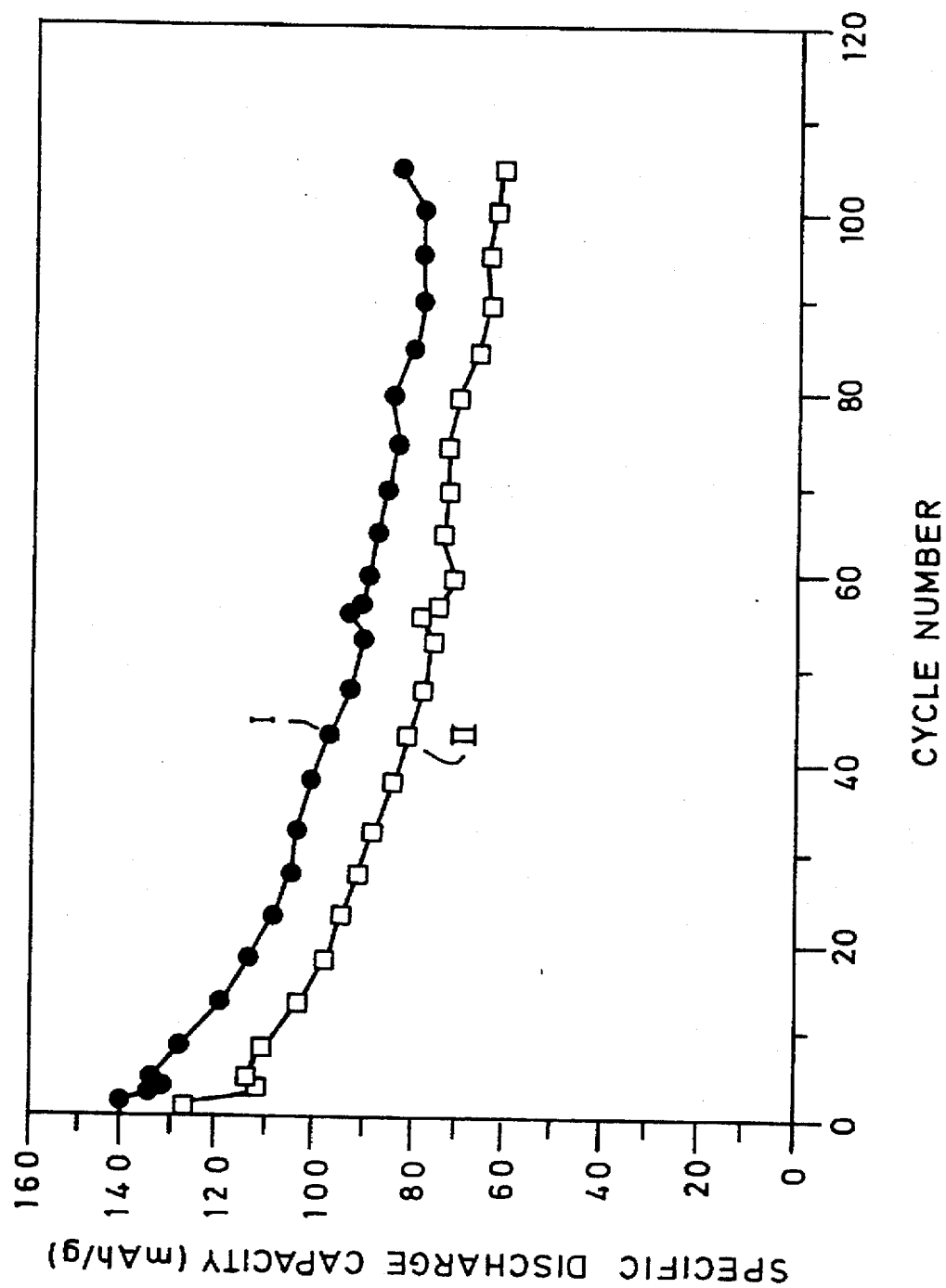
FIG. 3 is a graph showing the variation of the specific discharge capacity of a secondary battery with repeated charge/discharge cycling, the cathode of the battery incorporating $LiMn_2O_{4+x}$ which in curve I, is prepared according to a second method of the invention, and in curve II is prepared according to the prior art method of U.S. Pat. No. 5,135,732.

This battery was subject to a charging/discharging cycling test and its specific discharge capacity measured at various cycles during the test. The test employed cut-off potentials of 3.7 volts and 2 volts a charge current of 450 microamps and a discharge current of 900 microamps. The test results are shown in FIG. 3 as curve I. A similar battery having a cathode incorporating $LiMn_2O_4$ prepared by the prior art method of U.S. Pat. No. 5,135,732 was also tested using a similar charging/discharging cycling test except that the discharge current was 440 microamps instead of 900 microamps. Curve I in FIG. 3 shows that the battery with the cathode formed from $LiMn_2O_{4+x}$ according to the invention, has a higher specific discharge capacity than that (curve II) of a battery with the cathode formed from $LiMn_2O_4$ according to the prior art U.S. Pat. No. 5,135,732. This is so, even though the higher discharge current of the tests of curve I would be expected to reduce the specific discharge capacity compared to the test results of curve II.

In a second series of tests, $LiMn_2O_{4+x}$ was prepared by the same method described above using lithium carbonate $Li_2CO_3$, but with the addition of 50 milligrams of carbon black to the lithium carbonate solution. A sample was tested in the manner described above by measuring the specific discharge capacity of a battery having a cathode made from the sample. The discharge current in the test was 1 milliamp/cm$^2$ and the charging current was 0.5 milliamp/cm$^2$. The test results, shown as curve I in FIG. 4, are compared with test results (curve II) for a similar battery having a cathode made from $LiMn_2O_{4+x}$ prepared using lithium carbonate as in the first embodiment without the addition of carbon black. These test results demonstrate that the addition of carbon in the preparation of $LiMn_2O_{4+x}$ produces a material which gives an increased specific discharge capacity when used as a cathode in a secondary battery.

I claim:

1. A method of preparing lithium manganese ternary oxide $LiMn_2O_{4+x}$, where $0 \leq x \leq 0.2$, comprising reacting a manganese-containing compound with a lithium-containing compound, wherein carbon is added to one of the manganese-containing and lithium-containing compounds before they react.

2. A method as claimed in claim 1 in which the manganese-containing compound comprises manganese acetate.

3. A method as claimed in claim 1 in which the reaction occurs in water.

4. A method as claimed in claim 3 in which the $Li Mn_2 O_{4+x}$ is formed as a precipitate and is dried.

5. A method as claimed in claim 4 in which the $Li Mn_2 O_{4+x}$ precipitate is heat treated in the temperature range 200° C. to 700° C.

6. A method as claimed in claim 1 in which the carbon comprises carbon powder.

7. A method as claimed in claim 1, wherein said carbon is added only to said manganese-containing compound prior to reaction with said lithium-containing compound.

8. A method as claimed in claim 1, wherein said carbon is added only to said lithium-containing compound prior to reaction with said manganese-containing compound.

9. A method as claimed in claim 1, wherein the lithium-containing compound is a lithium carbonate.

10. A method of preparing lithium manganese ternary oxide $LiMn_2O_{4+x}$, where $0 \leq x \leq 0.2$, comprising reacting a manganese-containing solution with a lithium-containing compound in an inert atmosphere, wherein carbon is added to the manganese-containing solution prior to reacting with the lithium-containing compound.

11. A method as claimed in claim 10 in which the carbon in the form of powder.

12. A method as claimed in claim 11 in which the proportion of the carbon added is up to 8 percent by weight of the $Li Mn_2 O_{4+x}$ produced.

13. A method as claimed in claim 12 in which the proportions of the carbon added is within the range 2 to 6 percent by weight of the $Li Mn_2 O_{4+x}$ produced.

14. A method as claimed in claim 13 in which the proportion of the carbon added is substantially 4 percent by weight of the $Li Mn_2 O_{4+x}$ produced.

15. A method as claimed in claim 10 in which the manganese-containing solution comprises manganese acetate.

16. A method as claimed in claim 10 in which the lithium-containing compound comprises lithium hydroxide.

17. A method as claimed in claim 16 in which ammonia is added to the lithium-containing compound.

18. A method as claimed in claim 10 in which a gelatinous precipitate is produced by the reaction between the manganese-containing solution and the lithium-containing compound, and the gelatinous precipitate is dried.

19. A method as claimed in claim 18 in which the dried precipitate is heat treated in the temperature range 200° C.–700° C. to form $Li Mn_2 O_{4+x}$.

20. Lithium manganese ternary oxide $LiMn_2O_{4+x}$, where $0 \leq x \leq 0.2$, which has been produced by reacting a manganese-containing compound with a lithium-containing compound, wherein carbon black is added to one of the manganese-containing and lithium-containing compounds before they react.

21. An electrode for a battery incorporating the lithium manganese ternary oxide as claimed in claim 20.

22. A battery incorporating an electrode as claimed in claim 21.

23. A method of forming an electrode for a battery comprising incorporating therein lithium manganese ternary oxide $LiMn_2O_{4+x}$, where $0 \leq x \leq 0.2$, which has been produced by reacting a manganese-containing compound with a lithium-containing compound, wherein carbon black is added to one of the manganese-containing and lithium-containing compounds before they react.

24. A method of producing a battery, comprising incorporating therein an electrode formed according to claim 23.

25. A method of forming an electrode for a battery comprising incorporating therein lithium manganese ternary oxide $LiMn_2O_{4+x}$, where $0 \leqq x \leqq 0.2$, which has been produced by adding carbon black to a manganese-containing solution prior to reaction of the manganese-containing solution with a lithium-containing compound, and thereafter reacting said manganese-containing solution with said lithium-containing compound.

26. A method of producing a battery, comprising incorporating therein an electrode formed according to claim 25.

* * * * *